United States Patent [19]

Hultin

[11] 3,850,468
[45] Nov. 26, 1974

[54] SNAP SHACKLE
[75] Inventor: Stefan K. Hultin, Capistrano Beach, Calif.
[73] Assignee: Nicrometal Marine Hardware Co., Inc., San Francisco, Calif.
[22] Filed: July 13, 1973
[21] Appl. No.: 378,990

[52] U.S. Cl. ................................. 294/83 R, 59/93
[51] Int. Cl. ........................................... F16g 15/08
[58] Field of Search .......... 59/93, 95, 86; 294/82 R, 294/83 R

[56] References Cited
UNITED STATES PATENTS

| | | | |
|---|---|---|---|
| 649,270 | 5/1900 | Collins | 59/95 |
| 703,713 | 7/1902 | Smith | 294/83 R |
| 827,795 | 8/1906 | Foucher | 294/83 R |
| 2,568,820 | 9/1951 | Osika | 294/83 R |
| 2,664,175 | 12/1953 | Hertel | 294/82 R |
| 2,672,230 | 3/1954 | Jetzke | 294/82 R |
| 3,428,355 | 2/1969 | Hamilton | 294/82 R |

Primary Examiner—C. W. Lanham
Assistant Examiner—Gene P. Crosby
Attorney, Agent, or Firm—Owen, Wickersham & Erickson

[57] ABSTRACT

A snap shackle has a body which serves as a trunnion. A hook is pivotally connected to one end of the body and a swivel is mounted for rotation on a bushing which extends across the other end of the snap shackle, between the body and the hook. The swivel and an associated line can swing freely about the axis of the bushing. The swivel also includes a rotatable link connection for the line which permits the line to rotate with respect to the body. A release pin for the snap shackle hook is axially movable within the bushing. What is new and novel about this device is its chain-like articulation permitting more direct load between the attaching line and point of attachment.

8 Claims, 5 Drawing Figures

PATENTED NOV 26 1974      3,850,468
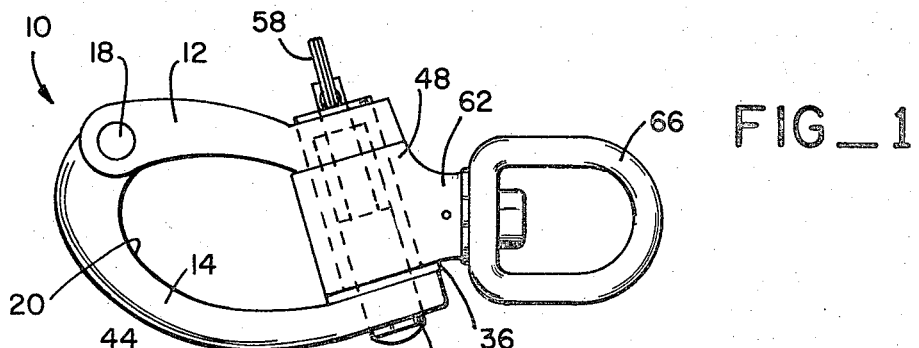
FIG_1
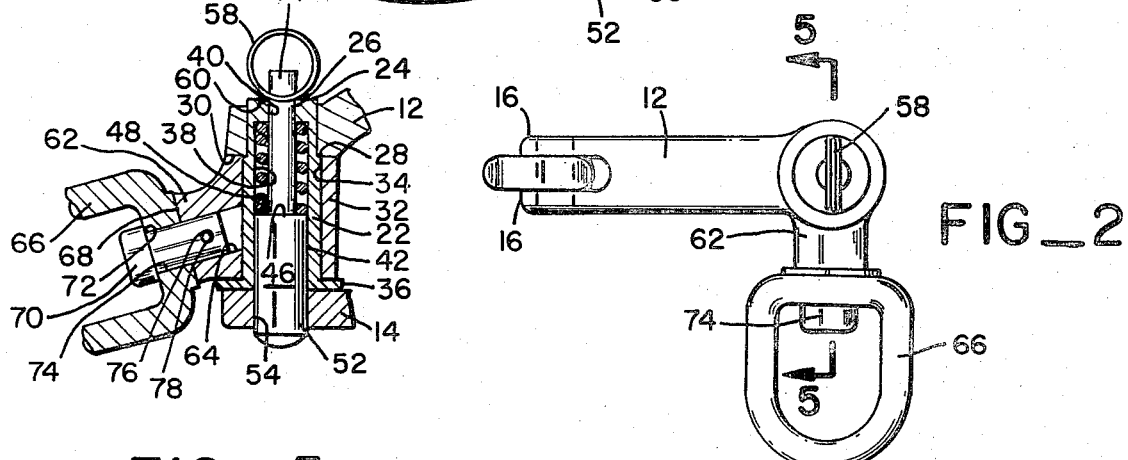
FIG_5      FIG_2
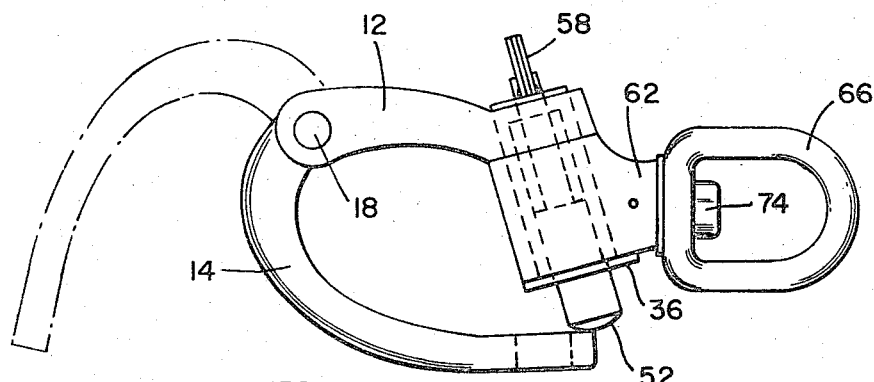
FIG_3
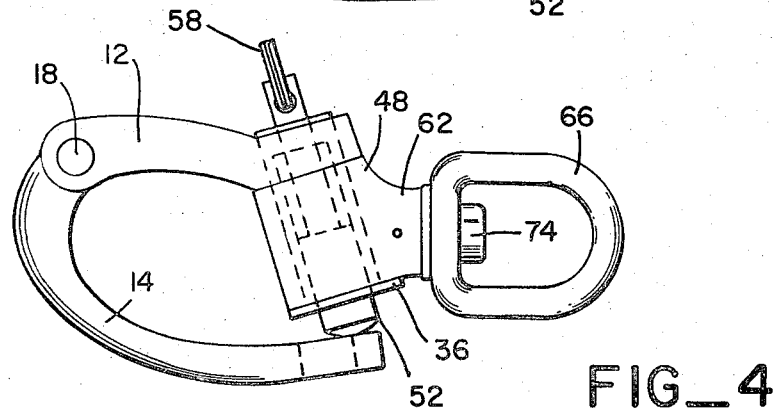
FIG_4

SNAP SHACKLE

BACKGROUND OF THE INVENTION

This invention relates to a snap shackle. Snap shackles are used to make connections and disconnections between lines and other apparatus.

Snap shackles have a body member and hook which is pivotally connected to one end of the body member. The other end of the hook is engageable with a release pin which holds the hook closed. The release pin is retracted to permit the hook to swing out to an open position.

The bodies of most snap shackles have an integrally formed hub for connection to the control line. The control line is wrapped around and spliced or otherwise attached to the hub.

There are often rapid and frequent changes in the direction of the force transmitted through the snap shackle and to the control line. The line connection to the snap shackle must accommodate such changes, and this in the past has caused problems of wear on the line at the connection to the prior art snap shackles.

It is a primary object of the present invention to overcome the problems of the prior art snap shackles. It is a closely related object to construct a swivel connection on a trunnion mount which provides articulation in all required directions for a free transfer of forces through the snap shackle without binding or chaffing at the control line connection.

SUMMARY OF THE INVENTION

A snap shackle constructed in accordance with the present invention comprises a body member which serves as a trunnion, a hook which is pivotally connected at one end to the body and swivel means at the other end of the body for connection to a control line. The swivel means include a bushing which extends at substantially a right angle from the end of the frame member. A swivel is mounted on the bushing for free rotation about the axis of a bushing through an angle of substantially 360 degrees. The swivel also includes a boss which extends at an angle to the axis of the bushing, and a link is pivotally mounted at the end of the boss for free rotation about the axis of the boss. Thus, when a control line is connected to the link, the control line can swing and turn freely with respect to the body. A release pin is disposed within the bushing and has an outwardly projecting end which is spring biased to a locking position with the other end of the hook. The projecting end of the release pin is curved to facilitate pressing the end of the hook over the release pin during closing of the snap shackle.

Snap shackle apparatus and methods which incorporate the structure and techniques above and which are effective to function as described above constitute specific objects of this invention.

Other objects, advantages and features of my invention will become apparent from the following detailed description of one preferred embodiment taken with the accompanying drawings.

In the drawings:

FIG. 1 is a side elevation of a snap shackle constructed in accordance with one embodiment of the present invention;

FIG. 2 is a top plan view of the snap shackle shown in FIG. 1 but showing the swivel turned 90 degrees;

FIG. 3 is a view like FIG. 1 showing how the hook swings to the open position shown in phantom outline;

FIG. 4 is a view like FIG. 1 showing the hook moved toward a closing position and partially depressing the release pin just prior to snapping shut; and FIG. 5 is a cross-sectional view taken along the line and in the direction indicated by the arrows 5—5 in FIG. 2.

DESCRIPTION OF THE PREFERRED EMBODIMENT

A snap shackle constructed in accordance with one embodiment of the present invention is indicated generally by the reference numeral 10 in FIG. 1.

The snap shackle 10 comprises a body member 12 and a hook 14 which is pivotally connected to one end of the body member between flanges 16 by a pivot pin 18.

The inside surface 20 of the hook 14 is engageable with the apparatus to which the snap shackle is connected.

The snap shackle 10 incorporates swivel means at the end of the body member 12 opposite that pivotally connected to the hook 14. The swivel means comprise (as best illustrated in the cross-sectional view in FIG. 5) a shoulder bushing 22 and a swivel 32. The bushing 22 has a reduced diameter end portion 24 which fits within an opening 26 in the body member 12. A shoulder 28 between the reduced diameter end 24 and the main, larger diameter body of the bushing 22 engages the inner surface 30 of the frame member 12.

The swivel 32 has an axial bore 34 which encircles the larger diameter body of the bushing 22.

The bushing 22 has a radially extending flange 36 at one end, and this flange 36 engages one end of the swivel 32. The other end of the swivel 32 abuts the inside face of the body member 12.

The bushing 22 has an internal bore 38 which extends from the flanged end 36 to a necked down portion 40.

A release pin 42 has a larger diameter part which fits within the bore 38 and a reduced diameter part 44 which extends through the opening in the necked down part 40 of the bushing. The shoulder 46 between the larger diameter part and the smaller diameter part of the release pin 42 provides one seating face for a coiled biasing spring 48. The other end of the spring 48 is seated on the surface 50 of the necked down part 40. The spring 48 biases the release pin 42 toward the position illustrated in FIG. 5 in which one end portion 52 projects outwardly beyond the flanged end of the bushing 22. This end portion 52 of the release pin fits within a circular opening 54 on the end of the hook 14 to hold the hook 14 locked in the closed position until the release pin is retracted within the bore 38.

The end portion 52 has a curved end surface as illustrated, to facilitate pressing the hook over the end of the release pin when closing the snap shackle as illustrated in FIG. 4.

The smaller diameter 44 of the release pin has an opening 46. A ring 58 passes through the opening 56 and seats within a disc shaped recess 60 to limit the movement of the end 52 outward of the bushing 22. The ring 58 also serves as a retraction ring for retracting the release pin within the bushing to open the hook 14. As thus far described it is apparent that the body member 12 is a trunnion for the swivel 32. When the hook is closed, the fit of the pin within the hook gives additional support for the hook end of the bushing.

The swivel 32 can swing through approximately 360 degrees about the bushing 22. The swivel 32 thus provides more than enough swinging movement to accommodate changes in the direction of the forces transmitted through the snap shackle.

The swivel means also permit free rotation about the axis of the control line in addition to free swinging movement about the axis of the bushing 32 as described above.

The swivel includes a boss 62 having a threaded inner bore 64. The link 66 is mounted for rotation on the end 68 of the boss by a cap screw 70 having a threaded end which engages the thread 64 of the bore. The underside of the cap screw head provides a shoulder 72 engageable with the inside surface of the link 66. The link 66 has an opening 74 which encircles an unthreaded portion of the cap screw shank. This opening 74 permits the link 66 to rotate freely about the axis of the bore 64 and the cap screw 70. The control line (not illustrated) is connected to the opposite end of the link 66.

The cap screw 70 is retained in position by a pin 78 which passes through an aligned opening 76 in the boss 62 and the threaded end of the cap screw as illustrated in FIG. 5.

The articulated swivel means shown in FIG. 5 thus permits the control line to swing and to rotate freely with respect to the body without chaffing or wear of the line itself.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A snap shackle comprising, a body member, a hook, pivot means connecting one end of the hook to one end of the body member, articulated swivel means at the other end of the body member for permitting an attached line to swing and to rotate freely with respect to the body member said swivel means including a swivel disposed between spaced-apart, opposed ends of the body member and the hook and mounted for swinging movement about a swivel axis intersecting said opposed ends of the body member and the hook, and a release pin mounted within the swivel for reciprocating movement along said swivel axis and having an end portion projecting from an end of the swivel for engagement with an opening in the end of the hook.

2. A snap shackle comprising, a body member, a hook, pivot means connecting one end of the hook to one of the body member, articulated swivel means at the other end of the body member for permitting an attached line to swing and to rotate freely with respect to the body member, a release pin within the articulated swivel means and engageable with the other end of the hook, and wherein the hook has a circular opening formed in said other end and the release pin has an end which projects from the articulated swivel means and which is curved to facilitate pressing the circular opening over the end of the release pin.

3. The invention defined in claim 2 including a spring within the articulated swivel means for biasing the end of the release pin outwardly of the articulated swivel means.

4. The invention defined in claim 1 wherein the body member is a trunnion.

5. The invention defined in claim 4 wherein the articulated swivel means include a bushing disposed at substantially a right angle to the inside face of the trunnion.

6. The invention defined in claim 5 wherein the swivel is freely rotatable on the outside of the bushing.

7. A snap shackle comprising, a body member, a hook, pivot means connecting one end of the hook to one end of the body member, articulated swivel means at the other end of the body member for permitting an attached line to swing and to rotate freely with respect to the body member, said body member comprising a trunnion, the articulated swivel means including a bushing disposed at substantially a right angle to the inside face of the trunnion and a swivel freely rotatable on the outside of the bushing and wherein the swivel includes a boss which extends at an angle to the axis of the bushing and the swivel and including a link which is pivotally connected to the boss for free rotation about the axis of the boss.

8. A snap shackle comprising, a body member, a hook, pivot means connecting one end of the hook to one end of the body member, articulated swivel means at the other end of the body member for permitting an attached line to swing and to rotate freely with respect to the body member, a release within the articulated swivel means and engageable with the other end of the hook, and wherein the hook has a circular opening formed in said other end and the release pin has an end which projects from the articulated swivel means and which is curved to facilitate pressing the circular opening over the end of the release pin, a spring within the articulated swivel means for biasing the end of the release pin outwardly of the articulated swivel means, a bushing disposed within the articulated swivel means and including a pin retractor connected to the end of the pin opposite that engageable with the hook for retracting the pin within the bushing to release the hook.

* * * * *